May 4, 1948.  J. M. RUSNAK ET AL  2,440,916
PRECISION MEASURING AND POSITIONING DEVICE
Filed Sept. 8, 1944  3 Sheets-Sheet 1

INVENTORS
J. M. Rusnak
J. W. Durkee
BY
Joseph K. Schofield
ATTORNEY

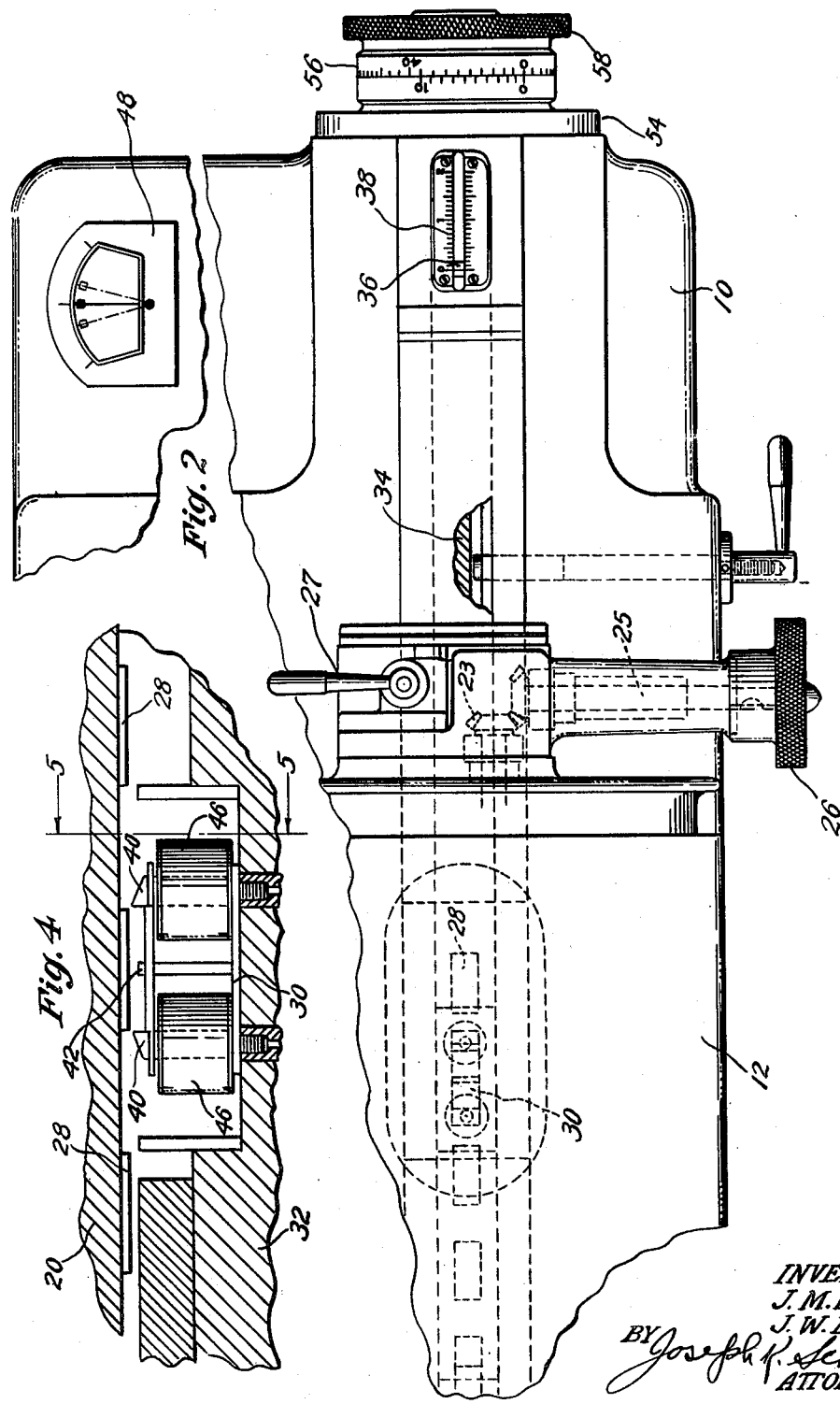

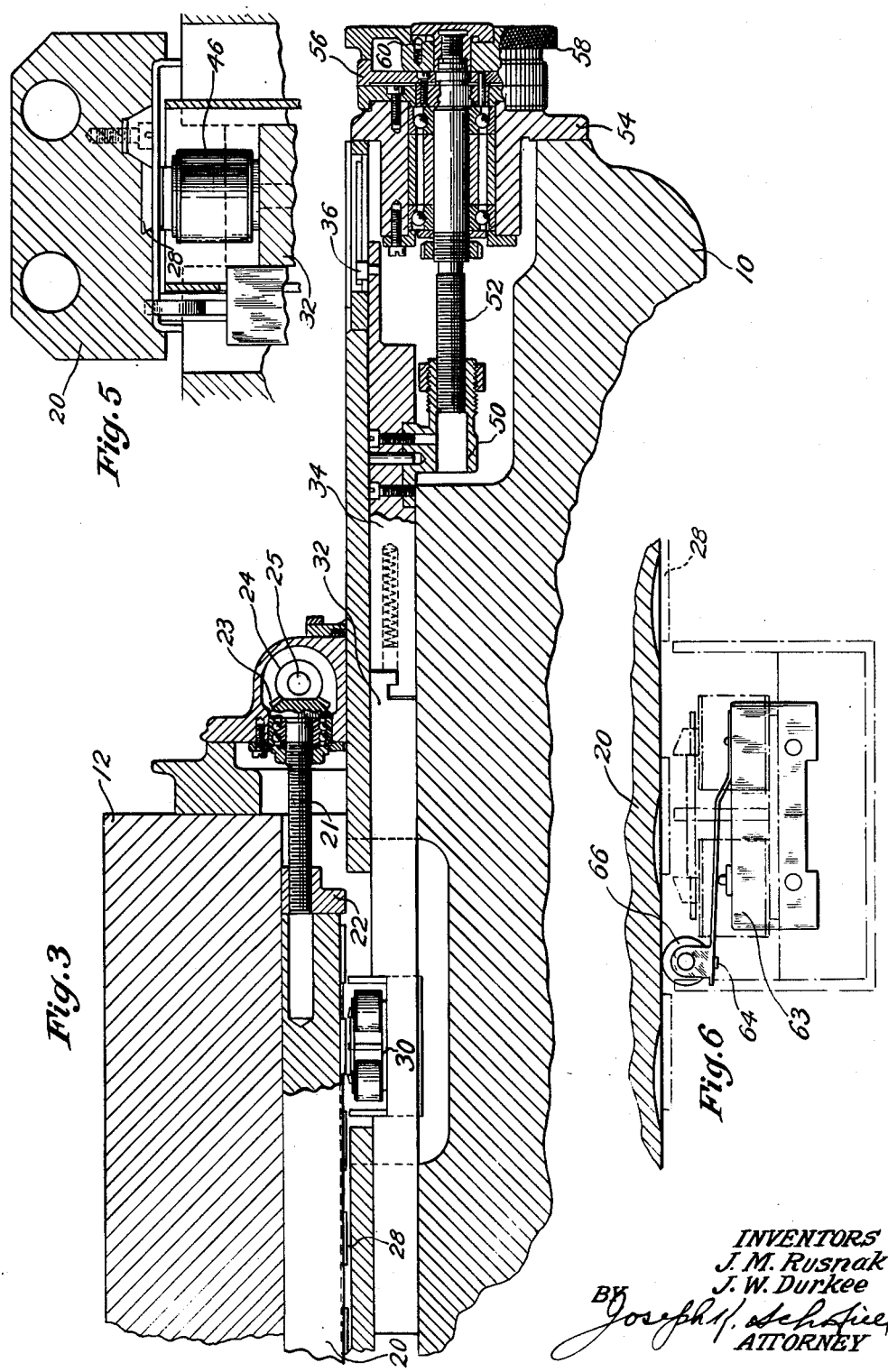

Patented May 4, 1948

2,440,916

UNITED STATES PATENT OFFICE 2,440,916

PRECISION MEASURING AND POSITIONING DEVICE

John M. Rusnak, West Hartford, and James W. Durkee, Manchester, Conn., assignors to Niles-Bement-Pond Company, West Hartford, Conn., a corporation of New Jersey Application September 8, 1944, Serial No. 553,160

10 Claims. (Cl. 77—1)

1

This invention relates to precision measuring and locating or positioning devices particularly for measuring the distances moved by a table of a machine tool adapted to perform operations on a work piece at predetermined spaced distances apart.

More particularly the invention relates to improvements in measuring means applicable to a precision boring machine of the type shown in the patent to Hanson 1,323,267, granted December 2, 1919, of which the present application forms an improvement.

An object of the present invention is to provide positioning means for a table, or other movable member of a measuring machine or machine tool, enabling the table or member to be moved accurately and quickly to a succession of different predetermined positions with extreme precision.

Another object of the invention is to eliminate the necessity of removing and resetting end measures in positioning the table to its successive positions and to provide electrical means to obtain the precise required setting of the table when moved any predetermined distance.

A still further object of the invention is to provide a bar of non-magnetic metal movable with the table in which is mounted a plurality of inserts having high magnetic permeability, the distance apart of these inserts along the bar serving to determine the position of the table in its setting at different positions; the inserts in any adjusted position of the table being centered relative to a magnetic head having an inductance bridge circuit and spaced magnetic poles enabling any of the inserts to be positioned relative to the head with extreme precision.

And finally it is an object of the invention to mount the magnetic head upon a rod movable with the spindle of a micrometer in the direction of movement of the table or movable member, the body of the head being housed within and the micrometer being mounted upon the support upon which the table moves; there preferably being provision for initially adjusting the position of the rod carrying the magnetic inserts in the direction of movement of the table.

With the above and other objects in view the invention may include the features of construction and operation set forth in the following specification and illustrated in the accompanying drawings.

In the accompanying drawings annexed hereto and forming a part of this specification, the invention is shown embodied in a jig boring machine of the vertical type but it will be understood

2 that the invention can be otherwise embodied and that the drawings are not to be construed as defining or limiting the scope of the invention, the claims appended to this specification being relied upon for that purpose.

In the drawings:

Fig. 2 is a fragmentary plan view of the machine showing the measuring means for the table relative to its support.

Fig. 3 is a longitudinal sectional view in elevation taken through the measuring mechanism for the table relative to the saddle or support on which it is slidably mounted.

Fig. 4 is a longitudinal sectional view in elevation upon an enlarged scale showing a portion of the measuring means.

Fig. 5 is a transverse sectional view of a portion of the measuring device taken upon the plane of line 5—5 of Fig. 4.

Fig. 6 is a front elevation of a switch used in connection with the magnetic head measuring device shown in Figs. 3, 4 and 5.

In the above-mentioned drawings there has been shown but one embodiment of the invention which is now deemed preferable, but it is to be understood that changes and modifications may be made within the scope of the appended claims without departing from the spirit of the invention.

Briefly, and in its preferred aspect, the invention may include the following principal parts: First, a support such as a base or saddle forming a part of a machine tool; second, a work supporting table movable thereon in a straight line; third, a magnetic head mounted for movement within the supporting member for the table in a direction parallel to the movement of the table and positioned at the inner end of a bar; fourth, a micrometer spindle attached to the outer end of this bar and adapted to move the magnetic head and bar predetermined limited but precise distances; fifth, a non-magnetic bar mounted below the table and preferably supported slidably therein within limited distances in the direction of movement of the table by means of an adjusting screw or other manual means; sixth, metal inserts adapted to be magnetized placed within the surface of the bar and disposed in a plane closely adjacent the magnetic head; seventh, an electrical indicating instrument connected electrically to the circuits within the magnetic head to indicate a centralized position of any of the magnetic inserts relative to the magnetic head; and eighth, a switch in said circuit opened and closed by movements of the elongated bar past said magnetic head to render the magnetic head inoperative during portions of the movement of the elongated magnetic insert carrying bar.

Figure 1:
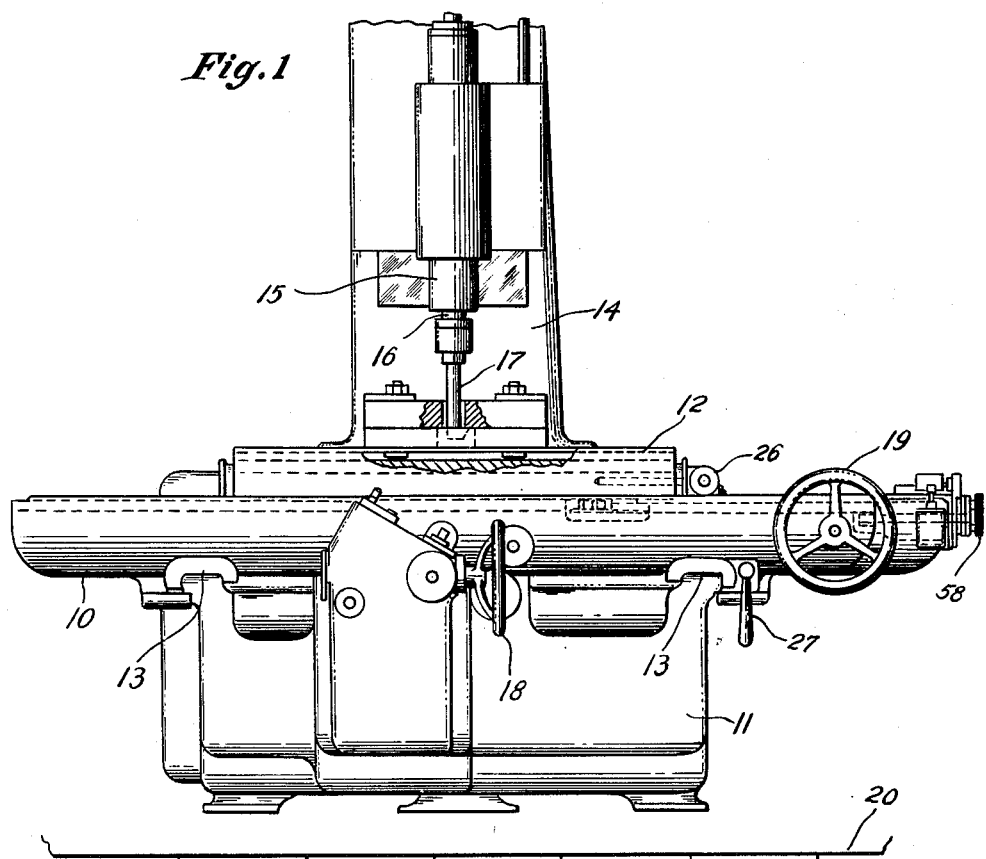
Figure 1 is a front elevation of the principal parts of a boring machine to which the present invention has been applied.

Referring more in detail to the figures of the drawing, there is shown in Fig. 1 the principal parts of a vertical boring machine, or other machine tool, having a horizontal movable saddle member 10 movable on a base 11 and supporting a transversely movable work supporting table 12. The directions of movement of the saddle 10 and the table 12 are at right angles to each other in planes one above the other. The saddle 10 is slidable on ways 13 on the upper surface of the base 11 and the table 12 is slidable transversely of the machine on suitable ways not shown.

Mounted on a column 14, or other suitable support, forming a part of the machine is a vertically slidable sleeve 15 having a spindle 16 therein in which is mounted a cutting or boring tool 17. The means for rotating, raising, lowering and changing the size of tool 17 within the lower end of the spindle 16 are not shown but may be in every way similar to those shown in the above-referred to patent. The machine illustrated in the drawings is designed primarily for boring accurately spaced holes in jigs, fixtures, etc. Movement of the saddle 10 along the ways 13 provided therefor in the base 11 may be effected manually by rotation of a hand wheel 18 through suitable connections (not shown) which form no part of the present invention. Also the work supporting table 12 may be movable along its ways (not shown) by rotation of a hand wheel 19 through suitable connections which have not been shown.

The present invention relates to means for determining the position of the saddle and the table successively at precisely spaced apart positions. The positioning means for the saddle on the base and for the table on the saddle are similar in every way to each other so that but one of these means will require specific description. The description will therefore be limited to the positioning means for the table transversely of the saddle. This is accomplished by means of the mechanism shown most clearly in Figs. 2, 3, 4 and 5.

Referring first to Fig. 3, the position determining means for the table 12 relative to the saddle 10 will be described. It will be seen that within the lower surface of the table 12 is slidably mounted an elongated bar 20 which is of non-magnetic material, preferably a metal having a thermal coefficient approximating that of iron or steel. This bar 20 is slidably mounted within the table 12 and extends substantially the entire length of the table and may be adjusted to different axial positions by means of a screw 21 entering a nut 22 positioned at one end of the bar 20. This adjusting screw is retained against axial movement and may be rotated, as shown, by means of a bevel gear 23 thereon drivingly connected to corresponding gear 24. A forwardly extending shaft 25 on the opposite end of which is mounted a suitable hand wheel 26 is connected to the gear 24.

Within the lower surface of this non-magnetic bar 20 is a dovetail slot or recess extending the entire length of the bar and in which are disposed inserts 28 of an alloy having high magnetic permeability. These inserts 28 are equally spaced throughout the length of the bar. These inserts are used to position the table 12 to successive predetermined positions in cooperation with the magnetic head 30 presently to be more fully described.

Within the upper surface of the saddle 10 is mounted a bar 32 extending a substantial distance under the table 12 so that in all positions of the table the bar 32 will be covered by the table. This bar 32, as is most clearly shown in Fig. 3, is movable in a direction parallel to the movement of the table 12 and is attached at its outer end to an intermediate bar 34 by a connection permitting limited flexibility. The outer end of this intermediate bar 34 has a pointer 36 movable with the bar adjacent a scale 38 fixed in the saddle 10 in order that the operator may at any time determine the approximate position of the bar.

At the inner end of the bar is a magnetic head 30 having a magnetic circuit comprising two magnetic poles 40 spaced apart in the direction of movement of the bar and on opposite sides of a central pole 42. The poles 40 are energized by coils 46 forming opposite sides of a Wheatstone bridge. The circuit including the coils 46 is balanced only when the magnetic head 30 is centered directly below one of the magnetic inserts 28 within the non-magnetic bar 20. This balance of the circuit is indicated by an electrical indicating instrument 48. This magnetic head will be described more in detail later in connection with the electrical diagram for indicating adjusted table positions.

The intermediate bar 34 referred to above has depending below it and attached thereto a threaded member 50 engaging the threads at the inner end of a micrometer spindle 52. The spindle 52 is mounted for rotation upon suitable antifriction bearings within a member 54 fixed in position on the saddle 10 and the outer end of this micrometer spindle is provided with a graduated dial 56 secured thereon and enabling the position of the nut 50 on the spindle 52 and consequently the axial position of the rod 34 and the rod 32 carrying the magnetic head 30 to be determined.

To rotate the micrometer spindle 52 to adjust the position of the magnetic head 30 in either direction the outer end of the spindle is provided with a suitable hand wheel or knob 58. As shown in Fig. 3, this hand wheel 58 is provided with a spring detent 60 engaging within any of a series of notches within the inner face of the knob. Rotation of the knob 58 will normally rotate the spindle 52 but, if the spindle has been moved to an extreme position, further rotation of the knob will cause the detent to ratchet over the notches without in any way causing damage to the spindle or its attached parts.

Figure 7:
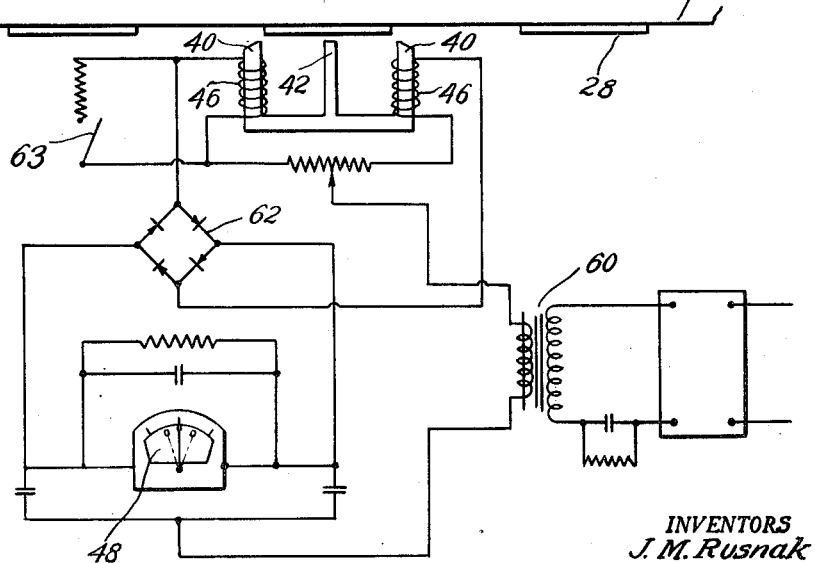
Fig. 7 is a wiring diagram showing the electrical circuits for the magnetic head and the indicating instrument forming part of the position determining mechanism.

The diagram for the circuit including the magnetic head 30 and an electrical indicating instrument 48 is shown in Fig. 7. From any suitable source of alternating current of say 60 cycles the current is furnished through a suitable transformer 60 to the coils 46 on the opposite arms 40 of the magnetic poles enclosed by the coils. Voltages from these coils 46, which are in a bridge circuit of the inductance type, are fed to a rectifier 62, preferably of the copper-oxide plate type, and the resultant output voltage of the rectifier is applied to the electric indicating instrument 48 having a central zero on the scale over which its pointer moves. The induced voltages within the coils 46 are directly affected by their magnetic circuits and the magnetic circuits are thrown out of balance or in balance by the position of the magnetic insert 28 in the bar 20 relative to the poles 40 of the magnetic head 30. It will be seen, therefore, that when one of these inserts 28 is centered relative to or disposed centrally between the terminals of the pole pieces 40 of the magnetic head 30 the induced voltages from the coils 46 will be balanced and the bar 20 and the table 12 with which the bar 20 is movable will be in its precisely correct position. This position will be indicated by the central position of the pointer on the electric indicating instrument 48. Any movement of the head 30 to the left or right relative to one of the inserts 28 will be indicated by deflection of the pointer of the electrical indicating instrument 48.

It will be seen from an inspection of Fig. 4 that there will be another centralizing position for the magnetic head 30 between adjacent inserts 28, the poles 40 of the magnetic head spacing the gap between two adjacent magnetic inserts. To avoid this position being used as in indicating position of the rod 20 and magnetic head 30 a normally closed switch 63 is provided which is opened and closed during movement of the bar 20 and inserts 28 past the magnetic head 30. The circuit for the indicating instrument 48 is thrown completely out of balance when the switch is closed, as by short-circuiting one of the coils 46 in all positions except those when the poles 40 approach or come to their true central position relative to one of the inserts 28. To open and close this switch 63 an arm 64 thereon having a roller 66 riding along the lower surface of the rod 20 adjacent the inserts is provided. Milled recesses are formed within the rod 20 at spaced intervals lying in the path of movement of the roller 66. These recesses cause alternate opening and closing of the switch and thus throw the magnetic head 30 into and out of proper operative condition during movement of the table 12. As one of the magnetic inserts 28 approaches its central position relative to the magnetic head 30 the lever 64 is depressed to open switch 63. During the remainder of the travel of the head 30 or bar 20 the roller 66 is raised to close the switch 63 and shunt one of the coils 46 in the bridge circuit.

To move the table to successive predetermined positions the table 12 is first positioned with the work piece properly located for the first operation such as boring a hole. The micrometer spindle 52 is then rotated to its zero position and the rod 20 moved axially by rotation of the hand wheel 26 until the pointer of electric instrument 48 is at its central zero position. The rod 20 may then be clamped in its adjusted position for all operations upon the same work piece by a binding screw operated by lever 27. To move the table 12 and bar 20 from this zero or initial position any predetermined distance, the micrometer screw 52 is first adjusted to the proper fractional part of the distance between adjacent inserts 28 (usually one inch or two inches) as called for by the distance to be moved. The table 20 then is moved by hand wheel 19 until the electric head 30 is over the insert 28 spaced from the first insert 28 used for the initial setting a distance equal to the number of inches the table is to be moved. Adjustments of the micrometer screw are required to be made only for the different fractional parts of an inch, or two inches, of the total distance the table 12 is to be moved, depending upon the spacing of the inserts 28. The different successive inserts 28 in the bar 20 are used to position the table 12 multiple unit distances of their spacings. This distance between the inserts 28 may, as stated above, preferably be one inch or a multiple thereof.

What we claim is:

1. A positioning device for a table comprising in combination, a base, a table movable thereon, a bar having spaced magnetic members thereon movable with said table, a magnetic head having spaced magnetic poles mounted within said base and movable a limited distance in the direction of movement of said table, a bridge circuit within said head including coils surrounding said poles, means to move said table, an indicating instrument connected in said circuit to determine when the position of a magnetic member relative to the poles of said magnetic head is such that the induced voltages in said coils are equal, and micrometer means to position said magnetic head within said base.

2. A positioning device comprising in combination, a magnetic head having spaced pole pieces, a circuit including coils about said pole pieces to energize said head and polarize said pieces, an indicating instrument in said circuit, a non-magnetic member mounted for movement past said head adjacent the ends of said pole pieces, and spaced magnetic members mounted for movement with said non-magnetic member past said head, said circuit for said head comprising an inductance bridge circuit including said coils whereby a central position of any of said magnetic members relative to said pole pieces will equalize the induced voltages within said coils and may be indicated by said instrument.

3. A positioning device for a machine tool table comprising in combination, a base, a table movable thereon, a bar having spaced magnetic inserts thereon movable with said table, a magnetic head mounted within said base and movable a limited distance in the direction of movement of said table, spaced coils mounted in a bridge circuit in said magnetic head, precision means to indicate the adjusted position of said magnetic head within the base, means to move said table, and an indicating electrical instrument in the circuit for said coils to indicate when an insert is located centrally relative to said magnetic head.

4. A positioning device for a machine tool table comprising in combination, a base, a table movable thereon, a bar having spaced inserts thereon movable with said table, means to adjust the bar in the direction of movement of the table, a magnetic head mounted within said base and movable a limited distance in the direction of movement of said table, precision means to indicate the adjusted position of said magnetic head within the base, means to move said table, and precision means to indicate when an insert is located centrally relative to said magnetic head.

5. A positioning device for a table comprising in combination, a base, a table movable thereon, a bar having spaced magnetic members thereon movable with said table, a magnetic head having spaced magnetic poles mounted within said base and movable a limited distance in the direction of movement of said table, precision means to indicate the adjusted position of said magnetic head within the base, means to move said table, and precision means to indicate when an insert on said bar is disposed centrally between the poles of said magnetic head.

6. A positioning device comprising in combination, a magnetic head having spaced pole pieces, a circuit including coils about said pole pieces to energize said head and polarize said pieces, an indicating instrument in said circuit, a non-magnetic member mounted for movement past said head adjacent the ends of said pole pieces, and spaced magnetic members mounted thereon for movement with said non-magnetic member past said head and adjacent said poles, whereby a central position of any of said magnetic members relative to said pole pieces will equalize the induced voltage within said coils and may be indicated by said instrument.

7. A positioning device for a table comprising in combination, a base, a table movable thereon, a bar having spaced magnetic members thereon movable with said table, means to adjust the axial position of said bar relative to said table, a magnetic head having spaced poles, said bar being mounted within said base and movable a limited distance in the direction of movement of said table, electric circuit means to indicate when one of said magnetic members is centered between said poles, and precision means to indicate the adjusted position of said magnetic head.

8. A positioning device for a table comprising in combination, a base, a table movable thereon, a non-magnetic bar having spaced magnetic members thereon movable with said table, a magnetic head having spaced poles mounted within said base and movable a limited distance in the direction of movement of said table, precision electric circuit means to determine the centralized position of a magnetic member relative to the poles of said magnetic head, and micrometer means to indicate the adjusted position of said magnetic head within said base.

9. A positioning device for a table comprising in combination, a base, a table movable thereon, a non-magnetic bar having spaced magnetic members thereon movable with said table, a magnetic head within said base and movable a limited distance in the direction of movement of said table, an indicating instrument electrically connected in a circuit including spaced induction coils within said magnetic head whereby a centered position of a magnetic member relative to said magnetic head may be indicated, and micrometer means to indicate the adjusted position of said magnetic head within said base.

10. A positioning device comprising in combination, a magnetic head having spaced pole pieces, a circuit including coils about said pole pieces to energize said head and polarize said pieces, a non-magnetic member mounted for movement past said head adjacent the ends of said pole pieces, and spaced magnetic members thereon, each adapted to space the gap between said pole pieces and mounted for movement with said non-magnetic member past said head, whereby a central position of any of said magnetic members relative to said pole pieces will equalize the induced voltage within said coils and may be indicated by said instrument.

JOHN M. RUSNAK.
JAMES W. DURKEE.

REFERENCES CITED

The following references are of record in the file of this patent:

UNITED STATES PATENTS

| Number | Name | Date |
| --- | --- | --- |
| 1,660,435 | Craley | Feb. 28, 1928 |
| 1,757,929 | Shaw et al. | May 6, 1930 |
| 2,007,180 | Doran et al. | July 9, 1935 |
| 2,012,249 | Sassen | Aug. 20, 1935 |
| 2,167,189 | Verderber | July 25, 1939 |
| 2,200,884 | Hoagland | May 14, 1940 |
| 2,236,881 | Rusnak | Apr. 1, 1941 |
| 2,295,022 | Yanchek | Sept. 8, 1942 |
| 2,365,593 | Rights et al. | Dec. 19, 1944 |